United States Patent
Reinhold et al.

(10) Patent No.: US 8,326,293 B2
(45) Date of Patent: Dec. 4, 2012

(54) SCANNING AVAILABLE WIRELESS-DEVICE SERVICES IN MULTIPLE WIRELESS-RADIO TECHNOLOGY COMMUNICATION SYSTEMS

(75) Inventors: Stanley Reinhold, Allentown, PA (US); Steven E. Strauss, Orefield, PA (US)

(73) Assignee: Agere Systems LLC, Wilmington, DE (US)

( * ) Notice: Subject to any disclaimer, the term of this patent is extended or adjusted under 35 U.S.C. 154(b) by 383 days.

(21) Appl. No.: 12/517,890

(22) PCT Filed: Jan. 12, 2007

(86) PCT No.: PCT/US2007/000954
§ 371 (c)(1),
(2), (4) Date: Jun. 5, 2009

(87) PCT Pub. No.: WO2008/085176
PCT Pub. Date: Jul. 17, 2008

(65) Prior Publication Data
US 2010/0316155 A1      Dec. 16, 2010

(51) Int. Cl.
*H04W 4/00*    (2009.01)
*H04B 7/00*    (2006.01)
*H04M 1/00*    (2006.01)

(52) U.S. Cl. .............. 455/434; 455/515; 455/552.1

(58) Field of Classification Search .......... 455/434, 455/511, 550.1, 552.1, 515, 101, 103, 272, 455/277.1, 161.1
See application file for complete search history.

(56) References Cited

U.S. PATENT DOCUMENTS

| | | | | |
|---|---|---|---|---|
| 7,542,728 | B2 * | 6/2009 | Bitran et al. | 455/73 |
| 7,873,377 | B1 * | 1/2011 | Cocos | 455/515 |
| 2004/0203580 | A1 * | 10/2004 | Engelhart | 455/406 |
| 2004/0203893 | A1 * | 10/2004 | Kotzin | 455/456.1 |
| 2005/0266876 | A1 * | 12/2005 | Boesen | 455/552.1 |
| 2007/0066226 | A1 * | 3/2007 | Cleveland et al. | 455/63.1 |
| 2007/0178897 | A1 * | 8/2007 | Lagnado et al. | 455/434 |
| 2007/0183383 | A1 * | 8/2007 | Bitran et al. | 370/338 |

FOREIGN PATENT DOCUMENTS

| | | |
|---|---|---|
| EP | 1469554 | 10/2004 |
| EP | 1696579 | 8/2006 |
| JP | 2003169008 A | 6/2003 |
| JP | 2006180320 A | 7/2006 |
| JP | 2006310968 A | 11/2006 |

OTHER PUBLICATIONS

Chinese Office Action; Mailed Jun. 5, 2012 for corresponding Chinese Application No. 200780049725.8.
Japanese Office Action; Mailed Dec. 9, 2012 for corresponding JP Application No. 2009-545528.
Japanese Office Action; Mailed Jul. 25, 2012 for corresponding JP Application No. 2009-545528.

* cited by examiner

*Primary Examiner* — Nguyen Vo
(74) *Attorney, Agent, or Firm* — Mendelsohn, Drucker & Associates, P.C.; Kevin M. Drucker; Steve Mendelsohn

(57) ABSTRACT

In one embodiment, a wireless device having two or more antennas. The wireless device substantially concurrently determines (a) using a first antenna, whether a first communications service is available for data transfer, and (b) using a second antenna, whether a second communications service is available for data transfer. After determining that at least one communications service is available for data transfer, the wireless device uses both antennas to transfer data using a selected communications service.

8 Claims, 4 Drawing Sheets

SCANNING AVAILABLE WIRELESS-DEVICE SERVICES IN MULTIPLE WIRELESS-RADIO TECHNOLOGY COMMUNICATION SYSTEMS

BACKGROUND OF THE INVENTION

1. Field of the Invention

The present invention relates to multiple wireless-radio technology communications systems, and, in particular, to a communications scheme wherein a wireless device is adapted to communicate with disparate wireless services.

2. Description of the Related Art

Reliable and efficient transmission of information signals over imperfect communication channels is essential for wireless communication systems. One method of transmission is multiple-radio transmission, which increases the spectral efficiency of a wireless communications system. Multiple-radio transmission includes SIMO (single input, multiple output), MISO (multiple input, single output), and MIMO (multiple input, multiple output). In SIMO technology, one antenna is used at the source, and two or more antennas are used at the destination. In MISO technology, two or more antennas are used at the source, and one antenna is used at the destination. In MIMO technology, multiple antennas are employed at both the source and the destination.

In a typical MIMO transmission scheme, a transmitter employs two or more radios (transceivers) to send separate signals on two or more corresponding transmit antennas. The separately transmitted signals are combined as they pass through the channel, and a multiple-radio receiver receives the combined signals on each of two or more receive antennas. The receiver detects, demodulates, and further processes the received signals to extract the information.

In both single-radio and multiple-radio transmission schemes, a wireless device typically communicates with a plurality of cells that are served by base stations in a terrestrial or satellite cellular system. A typical cellular system may include hundreds of cells and may serve thousands of wireless devices. The cells generally serve as nodes in the system from which links are established between wireless devices and a Mobile Telephone Switching Office (MTSO) by way of the base stations serving the cells. Each cell may have allocated to it (i) one or more dedicated control channels, which are dedicated channels used for transmitting cell identification and paging information, and (ii) one or more traffic channels, which carry voice and/or data information. Through the cellular network, a duplexed radio communication link may be effected between two wireless devices or, through a Public Switched-Telephone Network (PSTN), between a wireless device and a landline device.

Several types of access techniques are conventionally used to provide wireless services to users of cellular systems. Traditional analog cellular systems generally create communications channels using a system referred to as Frequency Division Multiple Access (FDMA), wherein discrete frequency bands serve as channels over which wireless devices communicate with base stations. Typically, these bands are reused in geographically-separated cells in order to increase system capacity.

Modern digital cellular systems typically utilize different multiple-access techniques, such as Time-Division Multiple Access (TDMA) and/or Code-Division Multiple Access (CDMA), to provide increased spectral efficiency. In TDMA systems, such as those conforming to the GSM or IS-136 standards, carriers are divided into sequential time slots that are assigned to multiple channels, such that a plurality of channels may be multiplexed on a single carrier. CDMA systems, such as those conforming to the IS-95 Standard, achieve increased channel capacity by using "spread-spectrum" techniques, wherein a channel is defined by modulating a data-modulated carrier signal by a unique spreading code that spreads an original data-modulated carrier over a wide portion of the frequency spectrum in which the communications system operates.

Conventional spread-spectrum CDMA communications systems commonly use "Direct Sequence" (DS) spread-spectrum modulation. In DS modulation, a data-modulated carrier is directly modulated by a spreading code or sequence before being amplified by a power amplifier and transmitted. However, other forms of spread-spectrum modulation may be used.

When a wireless device in a cellular system is turned on, it generally searches for possible base stations with which to synchronize. In cellular systems, there are a number of possible radio channels or frequencies that the base stations can use, and the wireless device may have to scan all of these frequencies in order to find the best base station to use, in terms of signal strength and/or capacity. For example, in Wideband CDMA (WCDMA), there are about 300 possible radio channels separated by about 200 kHz, at about 1.9 GHz (uplink) and about 2.1 GHz (downlink).

In WCDMA, a wireless device uses certain control channels transmitted from the base stations to find and detect a cell. These control channels are known as the Primary Synchronization CHannel (P-SCH), Secondary Synchronization CHannel (S-SCH), and Common Pilot CHannel (CPICH). In general, the initial cell search procedure may work as follows: (i) P-SCH is used in order to detect a new cell; (ii) if a new cell is detected, S-SCH is used to find the timing and scrambling code for the new cell; and (iii) when the timing for the new cell is found, CPICH is used to measure the signal strength.

In principle, the wireless device may need to perform the cell search on each radio channel in order to be certain all base stations have been found. From these base stations, the best base station to use may be selected for use.

When performing the initial cell search in systems such as WCDMA, it may take a long time to synchronize with the base station. In particular, because of a large number of radio channels, it may take a long time to perform a frequency scan and a cell search. The speed of detecting multiple carriers and frequency bands is important in quickly finding a cell. Because of the length of time to perform such operations, a wireless device can often take between 30 seconds and several minutes to be in service after powering on or returning to a coverage area. This time period can be further increased when a wireless device that supports several bands and multiple-radio access technologies sequentially searches cells.

SUMMARY OF THE INVENTION

In one embodiment, the present invention provides a method of operating a wireless device comprising two or more antennas. The method includes: (a) determining, using a first antenna, whether a first communications service is available for data transfer; and (b) determining, using a second antenna, whether a second communications service is available for data transfer.

In another embodiment, the present invention provides a method of operating a wireless device comprising two or more antennas. The method includes: (a) determining, using a first antenna, whether a first communications service is available for data transfer; and (b) determining, using the first antenna, whether a second communications service is available for data transfer, wherein steps (a) and (b) are implemented at different frequencies.

In a further embodiment, the present invention provides a wireless device. The device includes two or more radios and two or more antennas. Each antenna is coupled to a respective radio. The first radio is adapted to determine, using the first antenna, whether a first communications service is available for data transfer. The second radio is adapted to determine, using the second antenna, whether a second communications service is available for data transfer.

In yet a further embodiment, the present invention provides a wireless device. The wireless device includes two or more radios and two or more antennas. Each antenna is coupled to a respective radio. The first radio is adapted to: (i) determine, using the first antenna, whether a first communications service is available for data transfer; and (ii) determine, using the first antenna, whether a second communications service is available for data transfer, wherein steps (a) and (b) are implemented at different frequencies.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

The present invention, in various embodiments, permits enhancement of consumer experience and cost savings by combining the use of multiple antennas with the ability to scan disparate wireless services dynamically, without user intervention, to locate the best-possible or least-costly service alternative. The existence of multiple antennas allows for simultaneous scanning of the multiple services, thus reducing the overall scan time significantly. Once a particular service is selected, the existence of multiple antennas can then be used to achieve the effects of diversity, including (i) eliminating multi-path signal distortion and (ii) implementing adaptive or "smart" antenna arrays whose signal-processing algorithms are adapted to continuously distinguish between desired signals, multi-path, and interfering signals and to calculate the arrival directions of the desired signals. Once the best-possible or least-costly available service alternative is established, the wireless device can then support interactive voice and data calls using multiple antennas dedicated to the chosen network facilities, as opposed to having to use an incumbent satellite or terrestrial cellular carrier.

Figure 1:
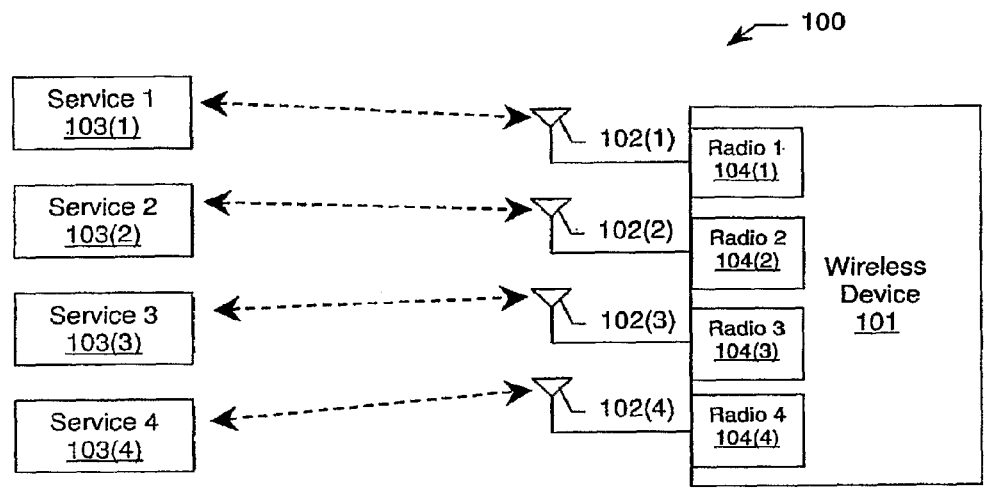
FIG. 1 is a block diagram of an exemplary system consistent with one embodiment of the present invention, with a wireless device operating in a first mode of operation, using all four antennas to scan for available services.

FIG. 1 illustrates an exemplary system 100 consistent with one embodiment of the present invention, with a wireless device 101 operating in a first mode of operation. As shown, system 100 includes wireless device 101 and four wireless communications services 103(1)-103(4). Wireless device 101 is a MIMO device having four antennas 102(1)-102(4), each coupled to a respective radio 104(1)-104(4) within wireless device 101. In the block diagrams herein, arrows having dashed lines represent an operation during which scanning for an available service is taking place, and arrows having solid lines represent an operation during which voice and/or data communications is taking place.

The term "wireless device," as used herein, encompasses a wide variety of portable or stationary wireless devices that can access a cellular system, including, without limitation, (i) a cellular radiotelephone with or without data processing or data communications capabilities, (ii) a Personal Digital Assistant (PDA) that can include a radiotelephone, pager, Internet/intranet access, Web browser, organizer, calendar, and/or Global Positioning System (GPS) receiver, and (iii) a conventional laptop, palmtop, or pervasive computing device that includes a wireless transceiver.

The terms "service" and "communications service," as used herein, include, e.g., Evolution, Data-Only (1×EV-DO); Evolution, Data-Voice (1×EV-DV); Radio Transmission Technology (1×RTT); Advanced Mobile Phone Service (AMPS); Code-Division Multiple Access (CDMA); CDMA2000; Enhanced Data rates for GSM Evolution (EDGE); General Packet Radio Service (GPRS); Global System for Mobile Communications (GSM); High-Speed Downlink Packet Access (HSDPA); integrated Digital Enhanced Network (iDEN); Push-to-talk (PTT); Time-Division Multiple Access (TDMA); Universal Mobile Telephone Service (UMTS); Worldwide Interoperability for Microwave Access (WiMax); Wireless Fidelity (WiFi); Voice over Internet Protocol (VoIP); Voice over Wireless Local-Area Network (VoWLAN); Bluetooth; WiBree; and ZigBee; as well as other voice- and/or data-communications services, such as those provided by Wide-Area Networks (WANs), Personal- (or Processor-) Area Networks (PANs), indoor wireless LANs, very-high-speed fixed and mobile wireless (point-to-multipoint) networks, acoustic communications, and broadcast systems, such as High-Definition Television (HDTV). The terms "service" and "communications service" should also be understood to include one or more individual frequencies, frequency bands, or frequency sub-bands within a given voice- and/or data-communications service.

In the first mode of operation, as shown in FIG. 1, each antenna 102(1)-102(4) is tied to a corresponding service 103(1)-103(4) and is used to determine whether that service is available. Accordingly, wireless device 101 includes a processor implementing an algorithm that simultaneously uses all four antennas 102(1)-102(4) and their corresponding transceivers 104(1)-104(4) to scan services 103(1)-103(4), respectively, for availability. If no services are determined to be available, then the scanning continues until a service is determined to be available. If a service is determined to be available, then the wireless device enters a second mode of operation, as follows.

Figure 2:
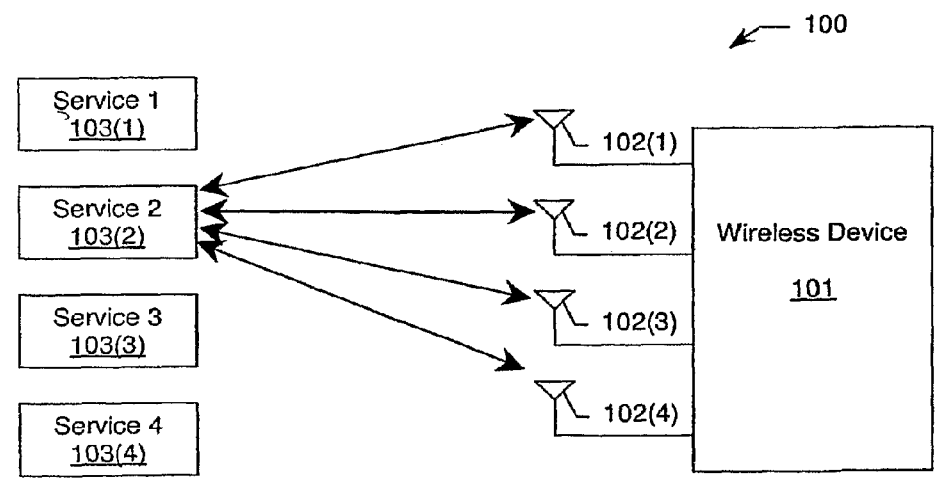
FIG. 2 is a block diagram of the system of FIG. 1 with the wireless device operating in a second mode of operation, using all four antennas for dedicated communications with a single service.

FIG. 2 illustrates system 100 with wireless device 101 operating in the second mode of operation. In this example, during the first mode of operation, service 2 was determined to be available. Accordingly, in the second mode of operation, scanning for available services ceases, and all four antennas 102(1)-102(4) and their corresponding transceivers 104(1)-104(4) (shown only in FIG. 1) become dedicated to service 2 to exploit the advantages of MIMO communication, including, e.g., using multi-path propagation to increase data throughput and range and/or to reduce bit-error rates. As long as service 2 remains available, wireless device 101 remains in the second mode of operation. If service 2 becomes unavailable, then the wireless device returns to the first mode of operation.

Figure 3:
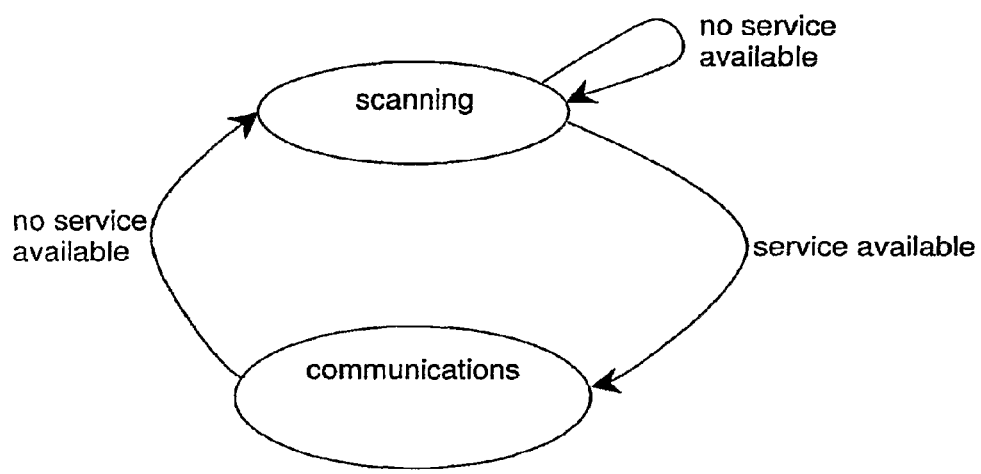
FIG. 3 is a state diagram for an exemplary algorithm for controlling the modes of operation of the wireless device of FIG. 1.

FIG. 3 is a state diagram for an exemplary algorithm for controlling the modes of operation of wireless device 101. As shown, wireless device 101 remains in a scanning state, with each of antennas 102(1)-102(4) used simultaneously to scan a different service, until one of services 103(1)-103(4) is determined to be available. Once a service is determined to be available, wireless device 101 enters a communications state, with each of antennas 102(1)-102(4) used simultaneously for MIMO communication with a single available service. Wireless device 101 remains in the communications state until the current service becomes unavailable, at which time wireless device 101 returns to the scanning state.

While, in FIG. 2, all four antennas 102(1)-102(4) are used for dedicated communications with service 2 during the second mode of operation, alternative embodiments of wireless device 101 are possible.

Figure 4:
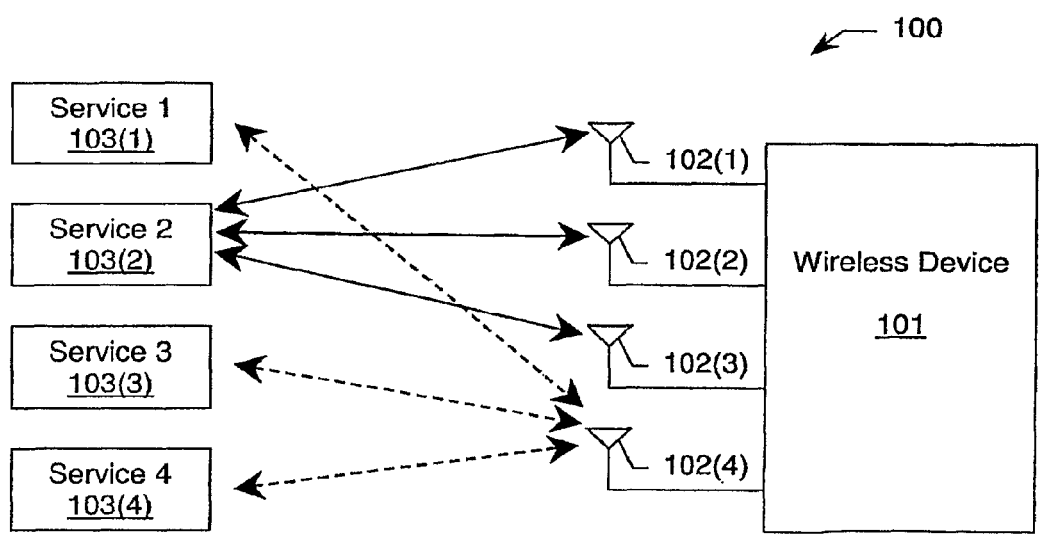
FIG. 4 is a block diagram of an exemplary system consistent with one embodiment of the present invention, with a wireless device operating in a third mode of operation, using three antennas for dedicated communications with a single service, while a fourth antenna is used to scan for other available services.

For example, in the embodiment shown in FIG. 4, wireless device 101 uses only three antennas 102(1)-102(3) for dedicated communications with service 2, while fourth antenna 102(4) is used to scan for other available services. Since fourth antenna 102(4) continuously scans for other available services while antennas 102(1)-102(3) are being used for dedicated voice and/or data communications with service 2, in the event service 2 becomes unavailable, wireless device 101 can advantageously quickly recover by switching antennas 102(1)-102(3) to an alternative available service already determined by antenna 102(4) to be available. While, in FIG. 4, fourth antenna 102(4) is the only one used to scan while the other three antennas 102(1)-102(3) are used for dedicated communications, in alternative embodiments, two or more antennas could be used for scanning, while the remaining antennas are used for dedicated communications. The allocation of scanning and communications tasks to the various antennas could also be dynamic. For example, fourth antenna 102(4) could initially perform a single-input, single-output (SISO)-based search to generate a list of available services, and then wireless device 101 could then sequence through the list using one or more of the other antennas for scanning, on a per-available service basis.

Alternatively, an algorithm can be implemented whereby, instead of switching to an alternative service only if service 2 becomes unavailable, wireless device 101 switches to an alternative service if the alternative service is determined to be preferable to service 2, in terms of bandwidth, speed, cost, and/or other factors. (Likewise, in the first mode of operation shown in FIG. 1 above, wireless device 101 could alternatively select an optimal service in terms of bandwidth, speed, cost, and/or other factors, rather than simply selecting the first service determined to be available.) An algorithm for switching can be (i) fully automated, so as to switch services without user intervention, (ii) manual, such that the wireless device emits an audible signal and/or displays a list of available services, prompting a user to make a selection, or (iii) hybrid, automatically switching based on certain rules and manually switching based on other rules. Depending on system configuration, such as whether handoff can be accomplished ad hoc from one service to another, in certain embodiments, switching can take place during a voice call or a data session, and in other embodiments, network and service switching may be limited to periods between calls or sessions.

While, in certain embodiments described above, each antenna is tied to a different service during the scanning process, it should be understood that, alternatively, each antenna could be used to scan for more than a single service.

Figure 5:
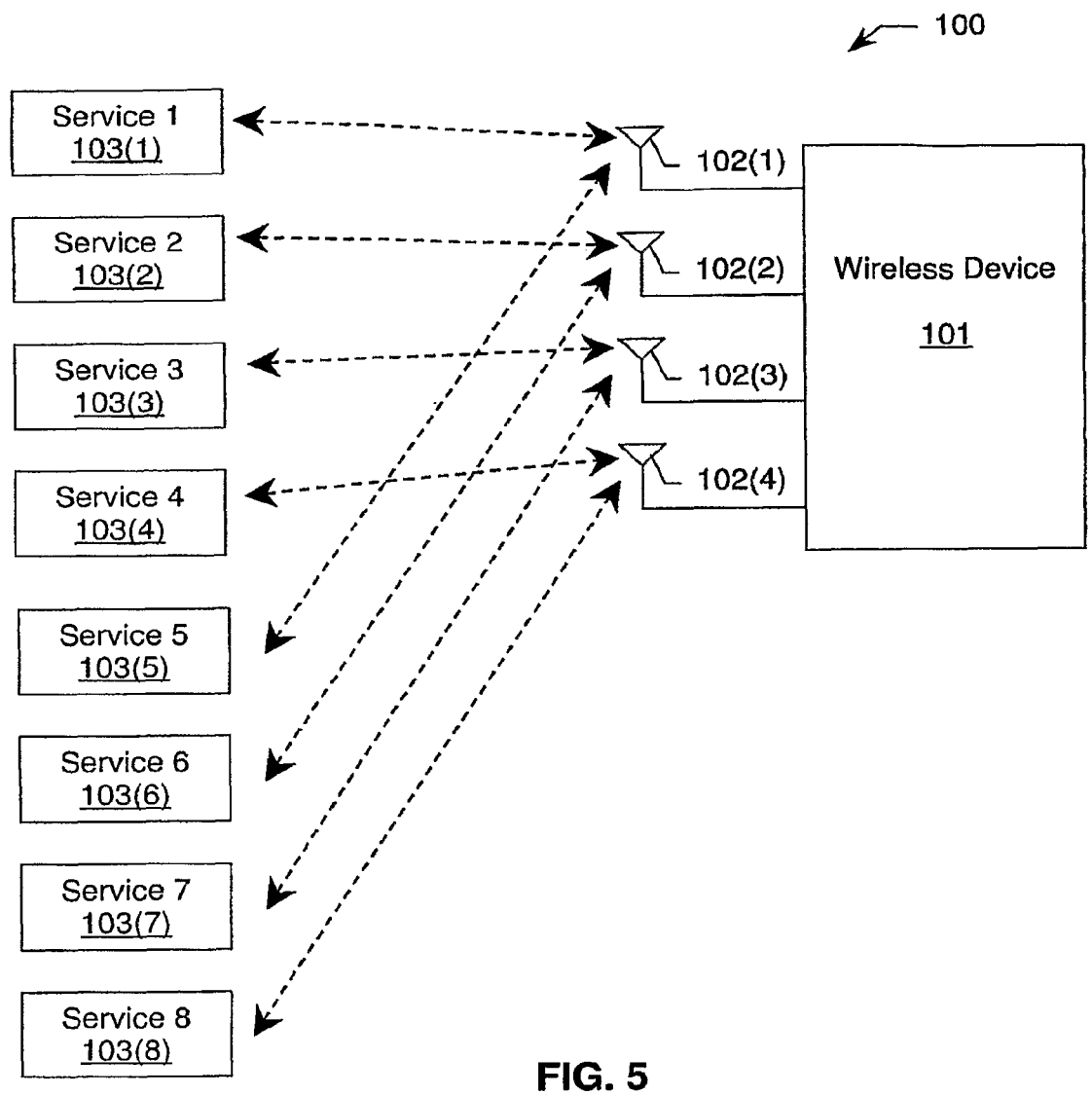
FIG. 5 is a block diagram of an exemplary system consistent with one embodiment of the present invention, with a wireless device operating in a fourth mode of operation, using each antenna to scan for two different available services.

For example, as shown in FIG. 5, where eight different services 103(1)-103(8) exist, antennas 102(1)-102(4) of wireless device 101 could be configured to scan simultaneously service 1 through service 4, respectively, and then scan simultaneously for service 5 through service 8, respectively, then return to scanning service 1 through service 4, etc. The scanning can occur at various timing schemes in various embodiments. For example, antenna 102(1) could alternate between scanning service 1 and service 5 at its own independent pace, while antenna 102(2) alternates between scanning service 2 and service 6 at its own independent pace, while antenna 102(3) alternates between scanning service 3 and service 7 at its own independent pace, while antenna 102(4) alternates between scanning service 4 and service 8 at its own independent pace.

Figure 6:
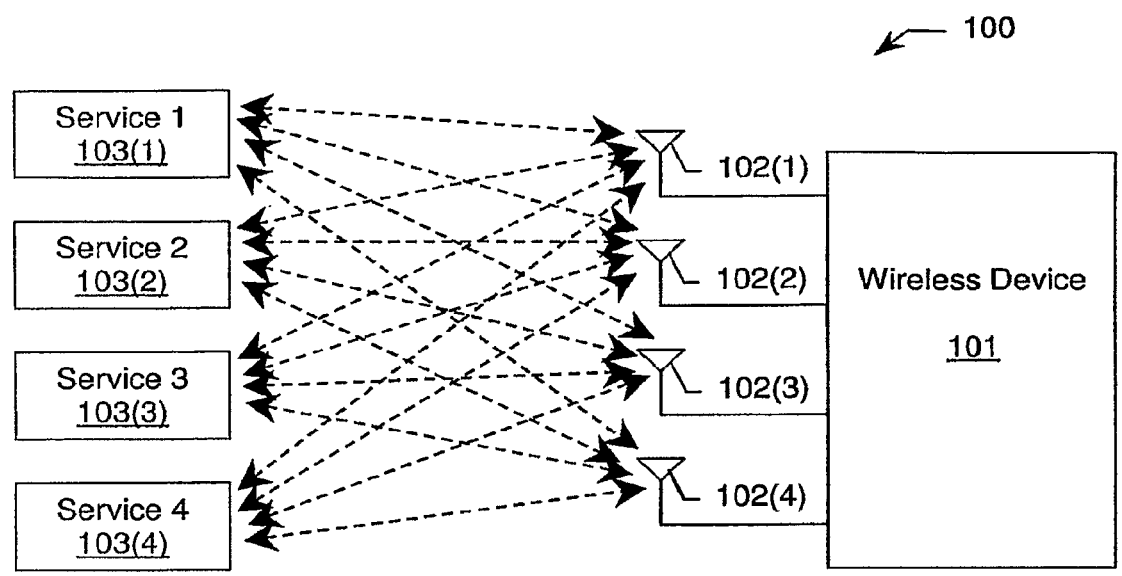
FIG. 6 is a block diagram of an exemplary system consistent with one embodiment of the present invention, with a wireless device operating in a fifth mode of operation, using each antenna to scan for the same set of four different available services.

Another embodiment in which each antenna scans for more than one service is shown in FIG. 6. As shown, in wireless device 101, each antenna 102(1)-102(4) is adapted to scan each of service 1 through service 4, and each antenna 102(1)-102(4) independently cycles through a scan of all four services until an available service is located. Once a service is located and a connection is established with the service, wireless device 101 could operate in like manner to wireless device 101 of FIG. 4, with one (or more) of the antennas continuing to scan for available services, while the remaining antennas are used for dedicated voice or data communications.

VoIP calls through the Internet or an intranet, which are typically relatively inexpensive or free, are typically made using a VoIP-enabled telephone or a personal computer running specialized software. However, these calls traditionally have required that a user manually and consciously initiate VoIP communications. In certain embodiments of the present invention, VoIP functionality is provided in a wireless device, such that the wireless device can permit relatively low-cost or no-cost local wireless facilities, such as VoIP, VoWLAN, or WiFi, to be used when available, rather than a higher-cost traditional satellite or terrestrial cellular-based network. Switching to VoIP can be performed either automatically, or by prompting a user to alert the user of the availability of a potentially less-expensive VoIP service wherever available. A cellular wireless device consistent with certain embodiments of the present invention is therefore desirably VoIP- and/or VoWLAN-enabled, adapted to log on automatically to subscribed available services, and configured to scan continually for available networks, just as would be done by a conventional WiFi-enabled device, such as an Ethernet card for a laptop or a PDA. The introduction of such versatile wireless devices would also advantageously allow certain load-balancing profiles to be assumed, so as to curtail the need for further build-out of existing cellular networking-support infrastructures.

In practical terms, a user of a wireless device consistent with certain embodiments of the invention, who is using the device for a voice call over a 3G (third-generation) network such as UTMS or CDMA2000, could walk into a WiFi "hotspot" and then be switched, either manually or automatically, to the WiFi network for the remainder of the call, thereby enjoying cost savings. Thus, an algorithm implemented in such a wireless device might be adapted to periodically de-allocate one of the antennas from the current MIMO service (in this case, the 3G network), allocate it to an alternative service (in this case, WiFi), scan to determine whether the alternative service is available, decide whether or not to switch to the alternative service, and effect hand-off to the alternative service. Alternatively, in certain embodiments, one or more antennas could be dedicated to scan continuously for available services, without being used for data transfer or voice communications.

Moreover, as mentioned above, the "services" supported by a wireless device consistent with certain embodiments of the present invention can include different frequencies, frequency bands, or frequency sub-bands. For example, WiFi 802.11a operates at 5 GHz, while WiFi 802.11b and 802.11g operate at 2.4 GHz. A wireless device consistent with certain embodiments of the present invention would therefore desirably include an antenna structure to support both of these frequencies. While antennas typically have a given physical length tuned for a given frequency band, it is contemplated that one antenna could be used with different frequency bands, e.g., by dynamically changing its length or using an active antenna containing one or more arrays of antenna elements.

It should be understood that, although the foregoing discussion refers to antennas as being the devices that switch from one service to another, appropriate transceiver circuitry known in the art is provided for each of the antennas to effect the actual communications processing with the various services, in the various embodiments of the present invention. Such transceiver circuitry is adapted to support the various radio-access technologies, modulation schemes, and frequency bands appropriate for the services supported by the wireless device. It should further be recognized that a particular embodiment of the present invention may support one or more of the modes of operation described herein, but not necessarily all of these modes of operation.

In certain embodiments, a wireless device consistent with the present invention may be adapted to select more than one available service to be used concurrently for data and/or voice communications. For example, the wireless device could use a WiFi service for VoIP communications while using a GSM service to provide driving directions in real time.

At least a portion of the present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, or general-purpose computer.

The present invention can be embodied in the form of methods and apparatuses for practicing those methods. At least a portion of the present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. At least a portion of the present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims are recited in a particular sequence with corresponding labeling, unless the claim recitations otherwise imply a particular sequence for implementing some or all of those elements, those elements are not necessarily intended to be limited to being implemented in that particular sequence.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A method of operating a wireless device comprising two or more antennas, comprising:
   (a) generating, using a first antenna, a list of one or more communications services available for data transfer;
   (b) scanning, using at least a second antenna, to select an available communications service for data transfer, from among the one or more communications services on the list; and
   (c) after steps (a) and (b), using at least one of the two or more antennas to transfer data via the available communications service.

2. The invention of claim 1, wherein the available communications service is selected based on the available communications service having a lower cost than another communications service on the list.

3. The invention of claim 1, wherein the available communications service is selected based on the determination that the available communications service is available occurring before the determination that another communications service on the list is available.

4. The invention of claim 1, wherein the available communications service is selected based on the available communications service being selected by a user of the wireless device.

5. A wireless device comprising:
   two or more radios; and
   two or more antennas, each antenna coupled to a respective radio;
   wherein:
      the first radio is adapted to generate, using the first antenna, a list of one or more communications services available for data transfer;
      the second radio is adapted to scan, using at least the second antenna, to select an available communications service for data transfer, from among the one or more communications services on the list; and
      after the available communications service is selected for data transfer, using at least one of the two or more antennas to transfer data via the available communications service.

6. The invention of claim 5, wherein the available communications service is selected based on the available communications service having a lower cost than another communications service on the list.

7. The invention of claim 5, wherein the available communications service is selected based on the determination that the available communications service is available occurring before the determination that another communications service on the list is available.

8. The invention of claim 5, wherein the available communications service is selected based on the available communications service being selected by a user of the wireless device.

\* \* \* \* \*